United States Patent [19]

Karapita

[11] Patent Number: 4,645,156
[45] Date of Patent: Feb. 24, 1987

[54] SUSPENSION SYSTEM

[76] Inventor: Alexander D. Karapita, 38 Robinter Drive, Willowdale, Ontario, Canada, M2M 3R2

[21] Appl. No.: 602,316

[22] Filed: Apr. 20, 1984

Related U.S. Application Data

[63] Continuation-in-part of Ser. No. 319,379, Nov. 9, 1981, abandoned.

[51] Int. Cl.<sup>4</sup> ............................................. F16M 11/12
[52] U.S. Cl. ............................... 248/280.1; 248/123.1; 248/292.1
[58] Field of Search ................ 248/1, 648, 654, 292.1, 248/297.1, 280.1, 123.1; 267/65 C; 92/134, 98 D; 74/589; 188/301; 901/48; 16/1 C

[56] References Cited

U.S. PATENT DOCUMENTS

| | | | |
|---|---|---|---|
| 463,382 | 11/1891 | Flagg | 188/301 |
| 2,225,515 | 12/1940 | Wood | 267/65 C |
| 2,998,244 | 8/1961 | Francis | 267/65 C |
| 3,037,763 | 6/1962 | Steinhagen | 267/65 C |
| 3,917,200 | 11/1975 | Johnson | 248/654 |
| 4,000,873 | 1/1977 | Wallace | 248/654 |
| 4,043,251 | 8/1977 | Ohmi | 92/98 D |

Primary Examiner—Robert E. Garrett
Assistant Examiner—Mark A. Williamson
Attorney, Agent, or Firm—Sim & McBurney

[57] ABSTRACT

An apparatus for counterbalancing the weight of an object in the gravitational field includes a piston in a cylinder with one end exposed to atmospheric pressure and the other end exposed to a pressure below atmospheric. The pressure drop across the piston remains substantially unchanged as piston moves between two pistons; therefore, the piston is subject to a substantially unchanged force. A mechanism is provided to apply the substantially unchanging force against a swingable support member through a variable moment arm.

15 Claims, 12 Drawing Figures

FIG. 9

PERFECT BALANCE: Fa = Wb

FIG. 10

PERFECT BALANCE MAINTAINED:
Fa cos α = Wb cos α

SUSPENSION SYSTEM

This is a Continuation-in-Part of U.S. patent application No. 319,379, filed Nov. 9, 1981, now abandoned.

FIELD OF THE INVENTION

This invention relates to a device that has a piston-cylinder assembly for counterbalancing an object from an elevated support.

BACKGROUND OF THE INVENTION

Suspension systems for suspending an object wherein the weight of the object is counterbalanced so that the object can be moved in the gravitational field with apparent weightlessness are well known. They are used extensively for mounting tools, photographic equipment and measuring instruments. The counterbalancing force is provided by many different means. A simple weight suspended from a sheave is the most elementary means of counterbalancing but due to spatial and other limitations it is not always acceptable. Springs and other elastic members have also been used, but they have the disadvantage that the counterbalancing force is not constant over the full extent of their travel. A spring, for example, does not usually have a constant spring force for the various degrees of compression or extension over its range.

It is also known to utilize piston and cylinder assemblies to counteract the weight of an object being suspended. An exemplary prior patent is U.S. Pat. No. 4,000,873, Wallace, issued Jan. 4, 1977. In this patent, a telescoping piston and cylinder arrangement counterbalances the weight of the object.

Another exemplary patent is U.S. Pat. No. 3,917,200, Johnson, issued Nov. 4, 1975. In this device, pneumatic pressure is applied to a cylinder which acts in extension to counterbalance the weight of an object suspended on an arm.

A patent more relevant to the present invention is U.S. Pat. No. 2,225,515, Wood, issued Dec. 17, 1940. In this patent, the patentee suspends a weight directly from the bottom end of the piston within a vertical cylinder, the lower end of the piston being exposed to the atmosphere, the upper end of the piston being exposed to a constant pressure lower than the atmosphere. Wood also provides a specific source of constant fluid pressure below atmospheric utilizing automatic pressure controls. A difficulty with the Wood patent relates to the considerable complexity of the apparatus which maintains the upper chamber of the cylinder at a constant pressure below atmospheric. This apparatus involves pressure-responsive valves, a vacuum pump, various lines, and automatic pressure controls. In view of this considerable complexity, it is clear that it would be of advantage to have a self-contained system capable of providing a relatively constant pressure drop across the piston, regardless of piston position relative to the cylinder and without having to provide an external power source or a pressure-regulating apparatus of the kind utilized by Wood or similar thereto.

The provision of such a simplified but effective system is an object of one aspect of this invention.

The device disclosed herein has a further inventive aspect, relating to the way in which the substantially constant pressure drop across the piston can be transformed into a counterbalancing moment applied to a suspension arm supporting an object at a distance from a horizontal axis, in such a way that the counterbalancing moment diminishes or increases in the same ratio as the moment required to maintain equilibrium thereby keeping the object in place at any angle of the arm. It will be appreciated that, for example, as a suspension arm carrying an object at one end and pivoted at the other end swings down from the horizontal position (representing three o'clock on a clock face) to a downwardly extending position (for example equating to five o'clock on a clock face), the counterbalancing torque necessary to keep the object in place will diminish by a factor which can be expressed in terms of the cosine of the angle through which the swing arm has swung.

It is an object of a further aspect of this invention to provide for this automatic adjustment of the counterbalancing moment arm.

It is an object of a further aspect of the invention to provide an improved device for suspending an object in an easily manoeuvrable manner.

It is an object of yet a further aspect of the invention to provide a counterbalancing device that is effective and inexpensive to make.

SUMMARY OF THE INVENTION

Accordingly, there is provided an apparatus for counterbalancing the weight of an object in the gravitational field, which includes a cylinder having first and second opposed ends, and a piston slidably mounted within the cylinder. The piston defines with the first end a chamber exposed to atmospheric pressure, and defines with the second end a chamber in which the pressure is below atmospheric. The pressure drop across the piston from the first to the second chamber is substantially unchanged as the piston moves between two spaced-apart positions within the cylinder, whereby the piston is subjected to a substantially unchanging force. A swingable member is pivoted about a substantially horizontal axis, the member being adapted to support the object at a location spaced from the axis, and a mechanism is provided to apply the substantially unchanging force against the swingable member through a moment arm of which the length varies in proportion to the horizontal distance between the horizontal axis and a vertical line through the object.

This invention further provides an apparatus for counterbalancing the weight of an object in the gravitational field comprising suspension means for universally suspending the object to be counterbalanced and for following the object as it is moved universally in the gravitational field. The suspension means includes a piston-cylinder counterbalancing assembly having a piston and a cylinder reciprocable with respect to each other. The suspension means further includes a first element with a horizontal axis and a swingable arm swingable about the horizontal axis of the first element. The piston is connected to one of the first element and swingable arm and the cylinder is connected to the other thereof, whereby to reciprocate the piston and cylinder relatively to each other in response to swinging movement of the swingable arm about the horizontal axis of the first element. The cylinder has a first chamber at one end of the piston, the first chamber being at atmospheric pressure. The cylinder having a second chamber at the other end of the the piston, the second chamber having a substantially complete vacuum therein, whereby the net force on the piston as the piston and cylinder reciprocate with respect to each other is substantially the force of atmospheric pressure for all positions of the piston with respect to the cylinder. The suspension means and the piston and cylinder are interconnected so that the resultant force on the piston counterbalances the object as the piston and cylinder reciprocate with respect to each other.

BRIEF DESCRIPTION OF THE DRAWINGS

Example embodiments of the invention are shown in the accompanying drawings in which.

DETAILED DESCRIPTION OF THE DRAWINGS

Figures 1, 5:
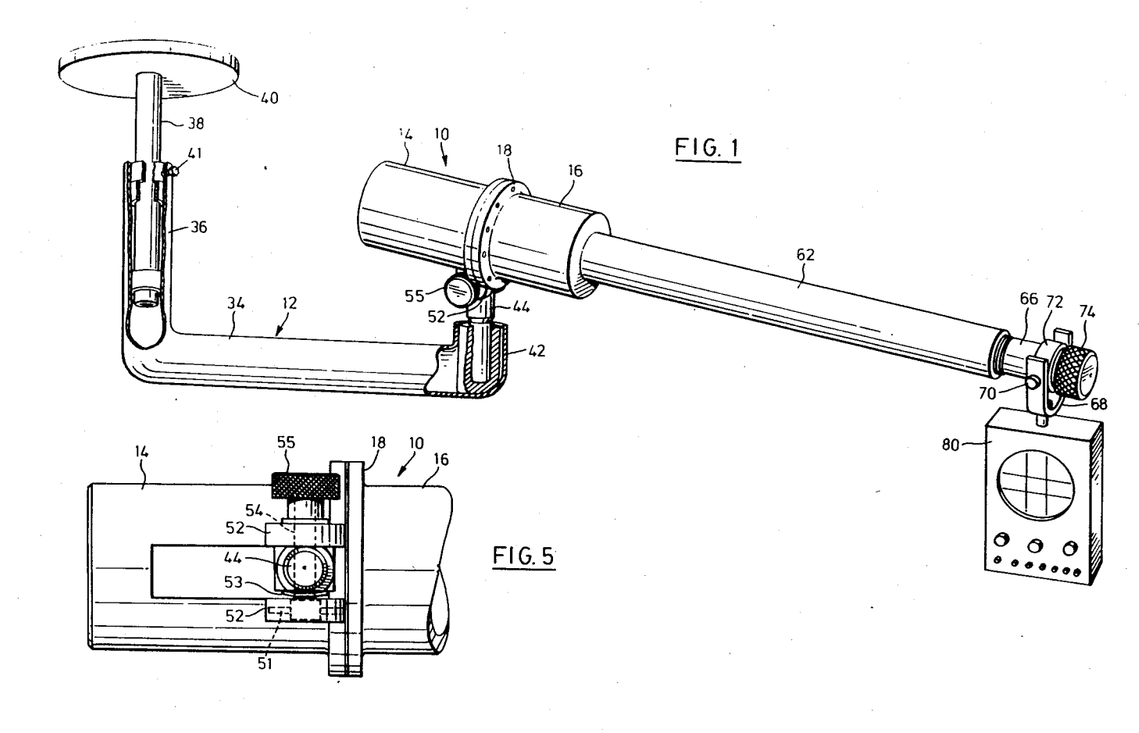
FIG. 1 is a perspective view of a suspension system.
FIG. 5 (on the same sheet as FIG. 1) is a bottom plan view of the counterbalancing assembly of the system of FIG. 1 showing the mounting shaft and variable friction means.
Figures 2, 3, 4:
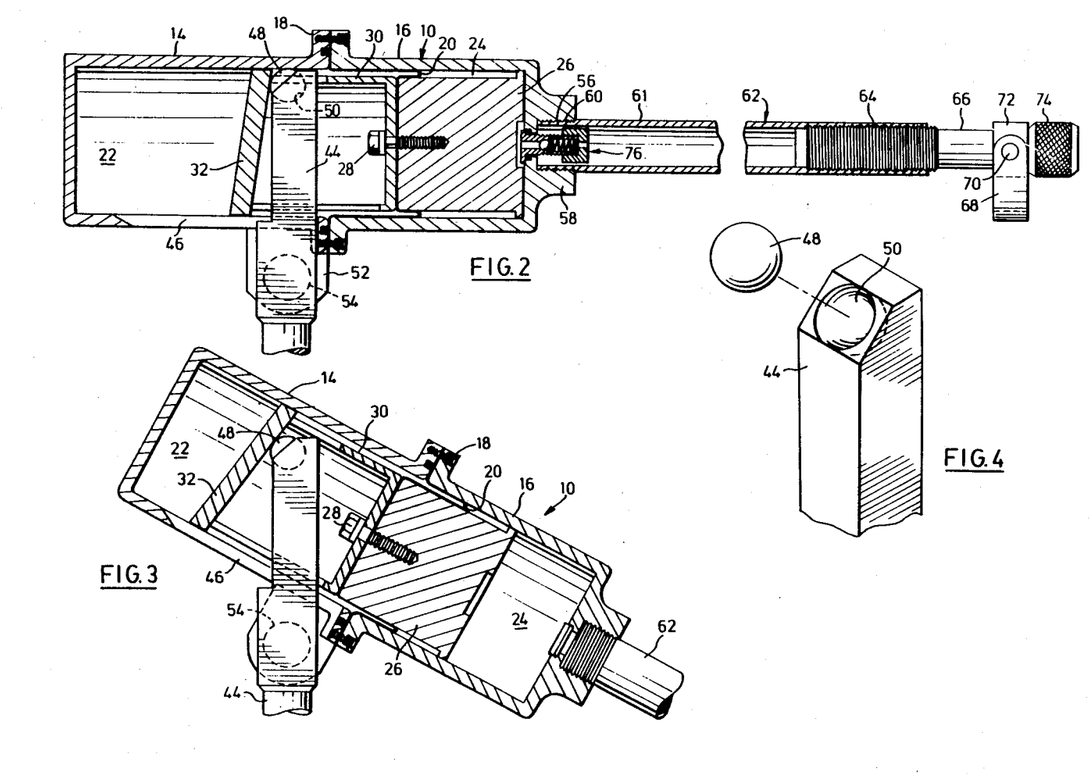
FIG. 2 is a cross-sectional view in elevation of the counterbalancing assembly of FIG. 1, in an unloaded position.
FIG. 3 is a view similar to FIG. 2 showing a position of the assembly when carrying a weight.
FIG. 4. is an exploded perspective view of the follower and its mount associated with the assembly of FIG. 2.

The example embodiment shown in FIGS. 1 to 5 consists of a cylindrical housing 10 mounted on a support 12 which is fixable to a ceiling or similar elevated support. As seen in FIG. 2, housing 10 comprises two cylinder portions 14, 16 fixed together at flanges 18 to clamp a rolling diaphragm 20 which divides the housing into a vented chamber 22 and a vacuum chamber 24. A piston 26 slides freely in vacuum chamber 24 and is fixed, by a bolt 28 passing through diaphragm 20, to a forked cam frame 30 which carries a cam plate 32 spaced from diaphragm 20 in chamber 22.

Support 12 comprises a U-shaped tubular member 34 having one upright sleeve 36 receiving telescopically a rod 38 downwardly projecting from a base plate 40 attachable to a ceiling. A set-screw 41, collar and bearing assembly (not seen) adjustably secure sleeve 36 on rod 38 in any selected position both vertically and horizontally (i.e. slidably and rotationally) and a head at the lower end of the rod prevents the sleeve from slipping off the end of the rod. The other upright sleeve 42 of member 34 telescopically receives a post 44 which projects upwardly through a slot 46 also acting to vent the chamber. Post 44 carries at its free end a spherical bearing 48 freely rotatable in a socket 50. Alternatively, a roller bearing could be substituted for spherical bearing 48. Bearing 48 bears against cam plate 32. Housing 10 is pivotably mounted on post 44 (see FIG. 5) by a pair of bosses 52 which are integral with the housing, and a pivot pin 54 which carries a knurled knob 55 into which the pivot pin is threaded. A roller pin 51 passes through a slot in an enlarged free end portion of pivot pin 54 and through a bore in boss 52. A bellville washer 53 is mounted on pivot pin 54 and functions as a variable friction brake when compressed between the enlarged free end portion of pivot pin 54 and the post 44 by the pulling action resultant from rotating knob 55.

An aperture 56 in end 58 of housing 10 opens into vacuum chamber 24 and receives the threaded end 60 of a tubular section 61 of an arm 62 which constitutes a swingable member. The other end 64 of tubular arm section 61 is threaded to receive a rod 66 which carries a yoke 68 pivotably mounted on the rod by a pin 70 and a collar 72. Rod 66 terminates at its free end in a knurled knob 74. Within aperture 60 of housing 10 is a spring loaded check-valve 76 which provides a one way passage for the release of air from vacuum chamber 24 into arm 62. Valve 76 acts to allow expulsion of any air which may leak into vacuum chamber 24 by an imperfect seal or by breathing through the seal or through the wall of the housing.

In the operation of the example embodiment of FIGS. 1 to 5, the normal position of rest of housing 10, i.e. with no object suspended from arm 62, is horizontal as seen in FIG. 2 with piston 26 abutting end 58 of the housing. In this position of piston 26 the air in vacuum chamber 24 is expelled through valve 76 into arm 62 and the ambient air. When an object, such as an oscilloscope 80, is suspended from the free end of arm 62, the arm 62 and piston-cylinder assembly 10 tends to turn clockwise about pivot pin 54 in post 44 of the base. Bearing 48 on the base abuts cam plate 32 on cam frame 30 while rolling downwardly along the cam plate. Since cam plate 32 is attached to piston 26 the end of cylinder 58 slides down and away from piston 26. The angulation of the cam plate 32 allows a reduction of the piston displacement for a given angular movement of the arm 62.

The suspension arm 62 upon which the oscilloscope 80 is suspended extends from the cylinder of the piston-cylinder assembly and the piston cylinder assembly is pivotably mounted on the base at 54. When the arm 62 and its piston cylinder assembly is swung about axis 54 the piston and cylinder of the assembly move relative to each other as a result of their interconnection through the bearing 48 on the base post 44 and the cam plate 32 connected with the cam frame 30 which is affixed to the piston 26. Thus, movement of the arm 62 in a vertical plane about the axis defined by the pivot pin 54 is translated into relative movement of the piston 26 with respect to the cylinder defined by the two portions 14 and 16.

There are two factors which contribute to the provision of a constant or substantially constant counterbalancing force for the weight of an object suspended from the end of the arm 62.

The first factor relates to the net force which is experienced between the piston 26 and the housing 10 due to the difference in the pressures which are in effect at the two ends of the piston.

It has already been explained that atmospheric pressure acts on the leftward or atmospheric side of the piston 26, since the chamber 22 is open to the atmosphere through the slot 46. The rightward side of the piston 26 in FIG. 2 is subjected to a substantially complete vacuum, and therefore no pressure is exerted leftwardly against the rightward end of piston 26. As a result, the net pressure experienced by the piston is atmospheric pressure, and the force applied to the piston will be determined by the atmospheric pressure and the piston head cross-sectional area over which the atmospheric pressure acts. Of course, an equal and opposite force will be applied to the housing 10, whereby to urge the piston 26 and housing 10 toward the position in which the volume of the vacuum chamber 24 is the least. Because there is no or substantially no pressure in the vacuum chamber 24 at the right of the piston 26, regardless of the position of the piston 26, the net force attempting to move the piston 26 to the right with respect to the cylindrical housing 10 will remain constant.

The second factor contributing to a constant counterbalancing of an object suspended at the rightward end of the arm 62 is the geometric relationship of various portions of the apparatus shown in FIG. 2. In FIG. 2, it will be appreciated that the actual force tending to restore the arm 62 to the horizontal position (after it has rotated clockwise under the influence of a weight suspended at its rightward end) is the force exerted between the bearing 48 and the cam plate 32, which is identical to the force exerted by atmospheric pressure against the leftward end of the piston 26 and equal to the force of atmospheric pressure on housing 16. This force is constant, and is the same regardless of the angle of rotation through which the arm 62 has moved. With arm 62 horizontal, this same force acts through a moment arm which is equal to the distance between the centre of the cam follower 48 and the axis of the pivot pin 54. For perfect balance, the moment which is the product of the said force times the centre-to-centre distance between the cam follower 48 and the pivot pin 54 must be the same as the moment defined as the weight of the object suspended at the rightward end of the arm 62 times the distance between the axis of the pivot pin 54 and a vertical line passing through the centre of gravity of that object. This is a simplified equation which ignores the weight of the arm 62 itself. It is assumed for the purposes of this discussion that the arm is weightless, or is itself in balance about the pivot pin 54, in the absence of any object being suspended from the rightward end of the arm 62.

Figure 9:
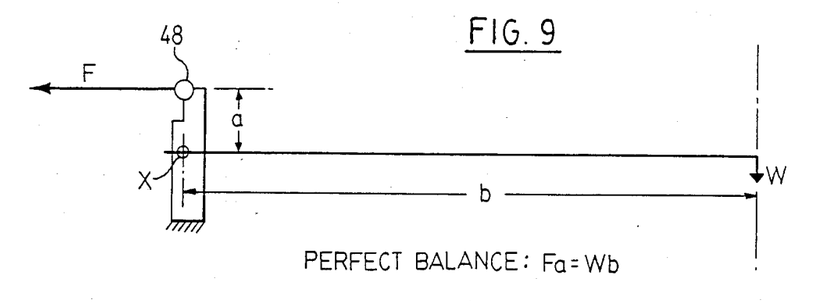
FIGS. 9 and 10 are vector diagrams illustrating how the counterbalancing moment adjusts itself to the moment exerted by the object being suspended.

Looking at FIG. 9, the force F represents the force exerted between the bearing 48 and the cam plate 32, and the distance a represents the moment arm which is the centre-to-centre distance between the bearing 48 and the pivot pin 54. Also in FIG. 9, the weight W represents the weight of an object suspended at the righthand end of the arm 62, and the distance b represents the distance between the axis of the pivot pin 54 and a vertical line passing through the centre of gravity of the object. As indicated in FIG. 9, ignoring friction, perfect balance is achieved when $Fa = Wb$. The axis of the pivot pin 54 is represented in FIG. 9 by the letter X.

Figure 10:
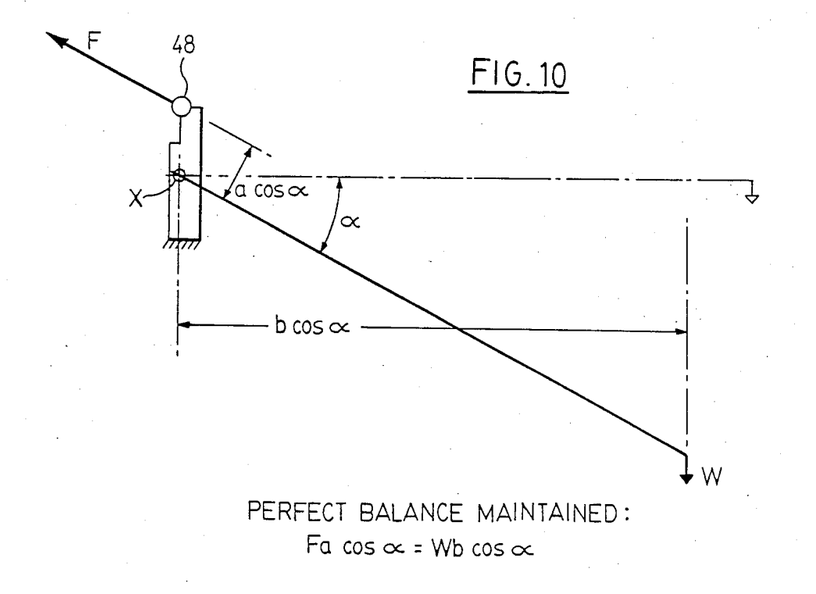

FIG. 10 shows the condition after rotation of the arm 62 through approximately 30°. This brings the vertical line passing through the weight W closer to the axis X of the pivot pin 54, reducing it to $b \cos \alpha$, where $\alpha$ is the angle through which the arm has rotated from the horizontal.

The force F acting between the cam following 48 and the cam plate 32 remains the same, however this force is now acting over a shorter moment arm, defined as $a \cos \alpha$, where $\alpha$ is the angle through which the arm 62 has rotated.

Thus it will be seen that, if perfect balance is achieved in the horizontal position, wherein $Fa = Wb$, then perfect balance will be maintained at any angle $\alpha$, since $Fa \cos \alpha$ will continue to be equal to $Wb \cos \alpha$.

While it has been stated that one of the factors contributing to perfect balance of the mechanism shown in FIG. 2 is the constant force exerted between the piston 26 and the housing 10, it is to be emphasized that this constant force does not necessarily require a total vacuum at the rightward end of the piston 26. What is essential is that the pressure drop across the piston 26 be and remain substantially constant regardless of its position within the housing 10, and of course the provision of a complete vacuum at the rightward end is very convenient because it does not require an elaborate pressure monitoring system of the kind contemplated by the aforementioned Wood U.S. Pat. No. 2,225,515. Nonetheless, such a pressure maintaining arrangement could be utilized successfully with the apparatus shown in FIG. 2, since it would combine with the equalization of moment arms explained with respect to FIGS. 9 and 10, to produce a restoring moment exactly matching the moment exerted by the weight W with respect to the axis X of the pivot pin 54.

It is further to be pointed out that some residual pressure within the chamber to the right of the piston 26 could be allowed, without interfering with the practical use of the device illustrated in FIG. 2.

If it were imagined that a small volume remained to the right of the piston 26 when the arm 62 was horizontal, and if it were imagined that a small pressure of perhaps 100 mm Hg were provided in that chamber, then it will be appreciated that, as the piston 26 moved to the left with respect to the housing 10, the pressure to the right of the piston would drop to progressively lower values, thus gradually increasing the net pressure across the piston, and increasing the force exerted between the bearing 48 and the cam plate 32. This would lead to an out-of-balance between the moment arms discussed with respect to FIGS. 9 and 10, however by utilizing the frictional provision explained in connection with FIG. 5 (the bellville washer 53 acting as a friction brake), the arm 62 could still be maintained in any position of angulation.

As an extension of this concept, if the small volume to the right of the piston 26 were in communication with a larger volume, for example with the centre chamber of the arm 62 itself, and if the valve 76 were absent, then the variation in the pressure felt at the right of the piston 26 during its movement with respect to the housing 10 would be decreased, thus leading to a more constant foroe between the bearing 48 and the cam plate 32.

In summary, it will be appreciated that although a near perfect vacuum located at the right of the piston 26 (in FIG. 2) represents a preferred embodiment of this invention, the apparatus described would still be quite workable and functional with either a constant, low but non-zero pressure to the right of the piston 26, or a non-zero pressure which underwent variation during movement of the piston 26, the variation being small enough to be compensated by the frictional effect of the bellville washer 53 (as well as the friction of cam follower 48 and the inherent friction between other moving parts).

It is well understood that the atmosphere itself changes in pressure from day to day. These pressure changes will bring about corresponding changes in the net force exerted across the piston 26, even though the weight of the object to be counterbalanced will remain constant. These minor variations in atmospheric pressure may be compensated by changing the length of the arm 62 by rotatably threading the rod 66 further into or further out of the tubular arm section 61. Because changes in atmospheric pressure are very gradual, it is unlikely that adjustment of the length of the arm 62 would have to be undertaken during a single use of the apparatus.

It will be appreciated that any suitable object may be suspended from the arm 62 by any suitable means. Yoke 68 and the oscilloscope 80 have been provided as merely illustrative examples. It will also be appreciated that the lengthening of the moment arm represented by a in FIG. 9 (i.e., the centre-to-centre distance between the cam follower 48 and the pivot pin 54) will give a larger weight-bearing capacity to the unit. Further, by increasing the diameter of the piston 26, a larger counterbalancing force and hence a larger weight-bearing capacity can be obtained.

Figure 6:
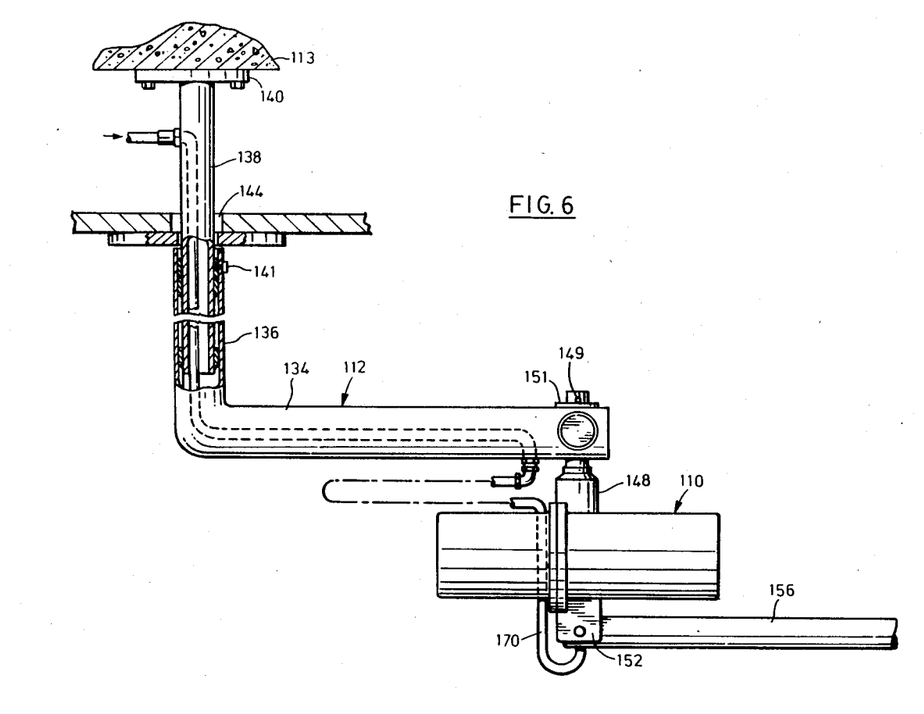
FIG. 6 is a side view in elevation of an alternative embodiment of a suspension system.
Figures 7, 8:
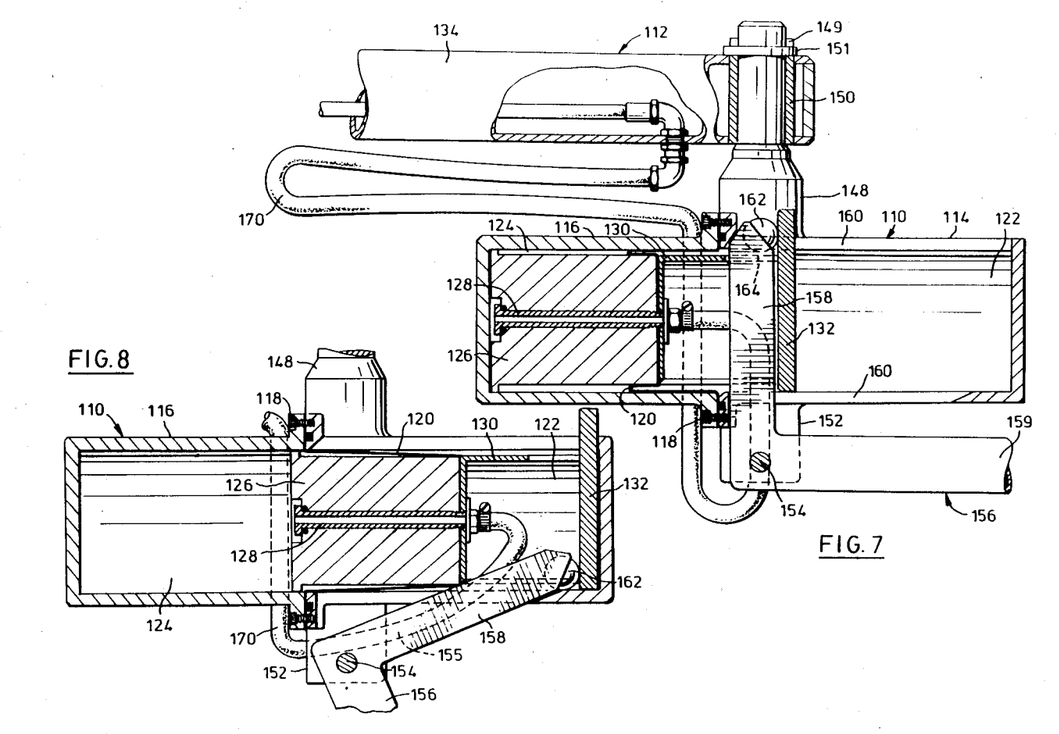
FIG. 7 is a cross-sectional view of the counterbalancing assembly of FIG. 6.
FIG. 8 is a view similar to FIG. 7 showing a position of the assembly when carrying a weight.

The alternate embodiment shown in FIGS. 6 to 8 of the drawings consists of a cylindrical housing 110 mounted on a support 112 which is fixable to a ceiling 113. As seen in FIG. 7, housing 110 comprises two cylinder portions 114, 116 fixed together at flanges 118 to clamp a rolling diaphragm 120 which divides the housing into a vented chamber 122 and a vacuum chamber 124. A piston 126 slides freely in vacuum chamber 124 and is fixed, by a tubular bolt 128 passing through a diaphragm 120 and piston 126, to a forked cam frame 130 which carries a cam plate 132 spaced from diaphragm 120 in chamber 122.

Support 112 comprises an angled tubular member 134 having an upright sleeve 136 receiving telescopically a further tubular rod 138 downwardly projecting from a base plate 140 fixed to ceiling 113. A set screw 141 adjustably secures sleeve 136 on rod 138 in any selected position both slidably and rotationally and suitable means prevents the sleeve from sliding off the rod. In the example embodiment a further face plate 142 bears against an aperture 144 in a false ceiling 146 through which rod 138 passes. A downwardly projecting post 148 integral with housing 110 is carried by the free end of the horizontal portion of member 134 in a bushing 150 (see FIG. 7). A pin 149 passes through the free end portion of post 148 and bears against a washer 151 which in turn bears against bushing 150 fixed in member 134.

A pair of bosses 152 integral with housing 110 project below the housing and carry a pin 154 on which an L-shaped arm 156 is pivotally mounted at its elbow, the arm 156 having a short bracket 158 perpendicular to its main extent. The bracket 158 of arm 156 extends upwardly through slots 160 in housing 110 opening into chamber 122, the slots acting to vent the chamber. Bracket 158 carries at its free end a spherical bearing 162 freely rotatable in a socket 164. Bearing 162 bears against cam plate 132. Again, bearing 162 could be replaced by a roller in a suitable recess in bracket 158. The arm 156 is tubular and is adjustable in length in the same manner as arm 62 in the previous embodiment (see FIGS. 1 and 2).

A suction tube 170 leads into rod 138 of support 112, passes out through member 134 adjacent post 148, and enters housing 110 through slot 160 (the tube lying in a recess 155 in arm 158) to connect with tubular bolt 128 at cam frame 130.

In the operation of the alternate example embodiment of FIGS. 6 to 8, a vacuum is maintained in vacuum chamber 124 through suction tube 170 which is connected beyond rod 138 to a suitable vacuum or low-pressure source. When an object is attached to the free end (not shown) of arm 156, the crank 158 pivots about pin 154 and bearing 162 bears against cam plate 132, forcing the cam plate to the right in chamber 122 of housing 110 as seen in FIG. 8. Thus, pivotal movement of the arm is transferred into movement of the piston within the cylinder. A weight suspended from the free end of arm 156 is in use counterbalanced by the constant pressure of the atmosphere on the atmospheric side of the piston. In FIG. 8 piston 126 moves to the right and in that Figure cam plate 132 has reached the end of the chamber 122. The equalization of the moment arms takes place exactly as with the embodiment of FIG. 2, and the vector diagrams of FIGS. 9 and 10 apply.

Cam plate 132 may extend upwardly out of housing 110 as shown in FIGS. 7 and 8 (but not in FIG. 6) to allow an increase of the arc through which the crank 158 of the arm 156 may pivot about pin 154. The crank 158 of arm 156 may be made adjustable in length in order to vary the counterbalanced carrying capacity of the device. These modifications are also applicable to the previous embodiment of FIGS. 1 to 5. Again, a larger diameter of piston 126 will increase the counterbalancing force available.

Diaphragm 20 or 120 is a rolling diaphragm such as that sold by the Bellofram Corporation under the trade mark BELLOFRAM. The BELLOFRAM rolling diaphragm is a long stroke, deep convolution, constant area diaphragm which is free positioning with complete relaxation at any point in its stroke. Moreover, this diaphragm is responsive to extremely small pressure changes and has no mechanical spring gradient. Consequently when used with a vacuum in the present invention a constant counterbalancing force over a wider range is provided.

It will be appreciated that the piston and diaphragm combination provides a convenient movable wall of a vacuum chamber. Nonetheless, other means might be used such as a piston and an O-ring. In this case a vacuum seal would be more difficult to maintain.

In the embodiment of FIGS. 7 and 8 the object suspension bracket is not a mere extension of the piston-cylinder assembly as it was in the embodiment of FIGS. 1 to 5. Rather, the piston-cylinder assembly remains horizontal and the suspension arm turns about an axis 154 on the frame to permit vertical movement of an object suspended. The requirement is that the object suspension arm 156 and the piston and cylinder be interconnected to reciprocate the piston and cylinder relatively to each other in response to movement of the suspension bracket in the gravitational field.

A still further arrangement would be to mount the piston-cylinder assembly in a vertical position and suspend the weight directly from the bottom of the piston.

In every case, however, one end of the piston is in a vacuum or low-pressure chamber and the other end is subject to atmospheric pressure so that as they change position relatively to each other there is no substantial change of pressure acting across the piston. This ensures a substantially constant counterbalancing force for all positions of the object being counterbalanced.

Figure 11:
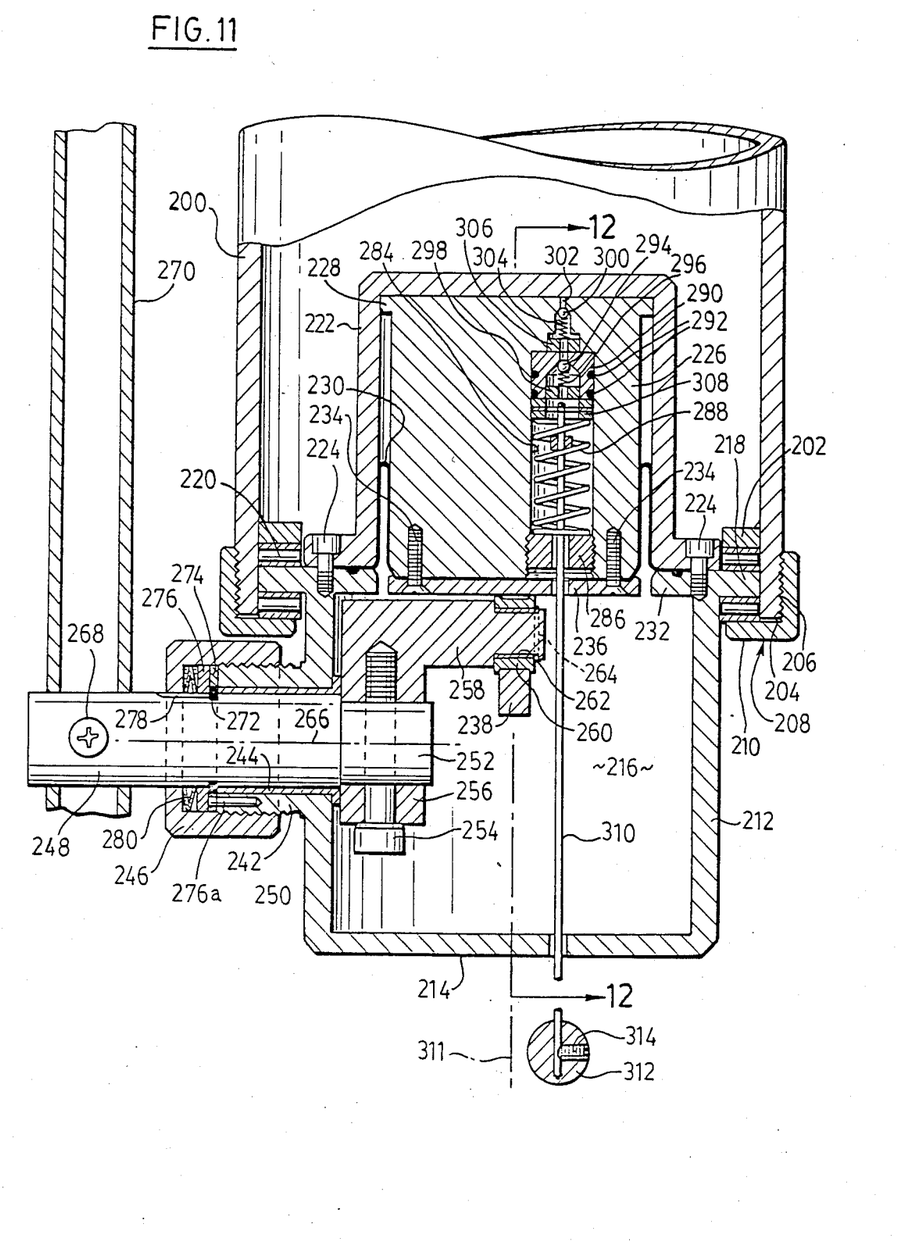
FIG. 11 is a vertical sectional view through a further embodiment of a suspension system incorporating this invention.
Figure 12:
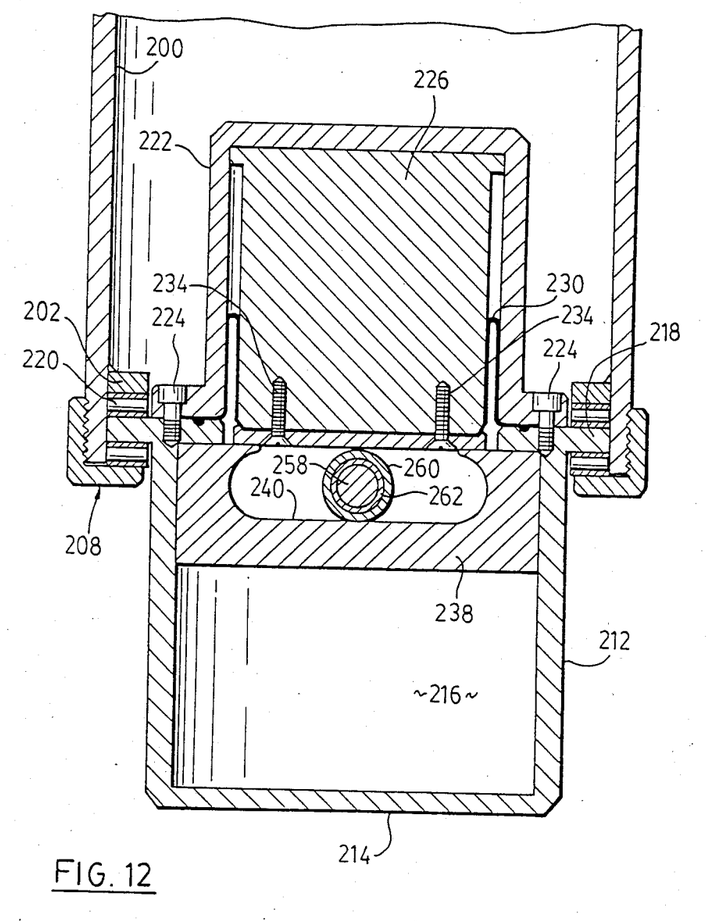
FIG. 12 is a sectional view taken at the line 12—12 in FIG. 11.

Attention is now directed to FIGS. 11 and 12, for a description of the third embodiment of this invention.

In FIG. 11, the cylindrical mounting member 200 is understood to be suspended firmly from the ceiling or some equivalent upper support means. The mounting member 200 has an inward annular ledge 202 firmly welded or otherwise affixed to it a short distance above its lower extremity 204. The outer lower surface of the mounting member 200 is threaded at 206, and this thread receives a nut 208 having an inwardly directed ledge 210.

A cylindrical housing 212 has a flat lower wall 214, thus defining a central chamber 216. The housing 212 has an outwardly directed annular flange 218, which is captured between the nut 208 and the ledge 202, with conventional bearings 220 between the flange 218 and each of the ledge 202 and the nut 208. This allows the flange 218 and the housing 212 to rotate with respect to the mounting member 200. Mounted above the housing 212, and secured with respect thereto, is a closed cylinder 222, the mounting being by way of four machine screws 224 (only two of which are visible in the sectional view of FIG. 11).

Slidably mounted within the cylinder 222 is a piston 226 having a flange 228 to aid in centering the piston. A diaphragm seal 230 is provided to interconnect the piston 226 with the housing 212, and it can be seen in FIG. 11 that the outer edge of the diaphragm seal 230 is sandwiched between the cylinder 222 and an inward flange 232 on the housing 212.

Bolted to the bottom of the piston 226 by machine screws 234 is a plate 236 to which is welded a cam member 238, best seen in elevation in FIG. 12. The cam plate 238 is in the shape of a C, and exhibits a substantially flat cam surface 240. Thus, the cam surface 240 moves vertically along with the piston 226.

Returning to FIG. 11, it will be seen that the housing 212 has an integral lateral boss 242 in which there is mounted a bearing sleeve 244. The boss 242 has an external thread on which a nut 246 is threaded. Extending rotatably through the sleeve 244 is a shaft 248 having a first portion 250 rotatably receivable within the sleeve 244, and a reduced portion 252 which is bolted by a bolt 254 to a crank arm 256, the crank arm 256 having an extension 258 supporting a bearing wheel 260 which has flanges at its axial ends and is adapted to contact the cam member 238. This is best seen in FIG. 11. A bushing 262 permits rotation of the bearing follower wheel 260 with respect to the extension 258, and a circlip 264 secures the bearing wheel 260 in place against the extension 258.

Thus, as the shaft 248 rotates, the bearing wheel 260 describes a circular path about the central axis 266 of the shaft 248.

At its leftward end, the shaft 248 is securely bolted by a bolt 268 to a suspension arm 270 which is the same in all other respects as the arm 62 shown in FIG. 1. For this reason, the arm 270 does not require further description. It is intended that the arm 270 carry an object at its end remote from the shaft 248, so that the object can be suspended in the gravitational field at any angular position of the arm 270.

A snap ring 272 is provided on the shaft 248, to maintain it in position with respect to the boss 242. Within the space between the nut 246 and the boss 242 is located an annular member 274 which is pinned with respect to the boss 242 by a pin 276a. Thus, the annular member 274 is stationary with respect to the housing 212. Also within the same space is a further annular member 276 which has an inward projection registering in a key way 278. Thus, the annular member 276 rotates along with the shaft 248. A pair of bellville washers 280 are also located in the same space, in a position to urge the annular member 276 against the annular member 274. It is evident from an inspection of FIG. 11 that, the tighter the nut 246 is applied, the greater is the force exerted between the annular members 274 and 276. This gives rise to a frictional effect which will tend to make the arm 270 "stick" in any given position. The degree of "stuckness" will depend upon how tightly the nut 246 is applied.

The embodiment under discussion also incorporates a mechanism by which any atmosphere which leaks into the space above the piston 226 within the cylinder 222 can be pumped out manually, in order to restore the required pressure drop across the piston 226.

Within the piston 226 itself is provided a bore 284 which is threaded at its lower end to receive an externally threaded member 286 which supports the lower end of the compression spring 288. The compression spring 288 urges upwardly to a limit position a cylindrical member 290 which has a double O-ring seal 292 with the inner surface of the bore 284, and which holds within itself a one-way check valve including a ball 294, a spring 296 urging the ball upwardly to close a passageway through the member 290, and a further member 298 which keeps the bottom end of the spring 296 in place.

Above the bore 284, still within the piston 226, is located a further check valve in which a ball 300 is urged upwardly to close the passage 302 by a spring 304 which is maintained in place by a member 306 threaded into a widened portion of the passageway. A crossrod 308 within the member 290 has attached to it the end of a rod or a flexible cord 310, and at the bottom of the latter is located a ball 312 which can be grasped manually. A set screw 314 secures the ball 312 in place on the rod or a flexible cord 310.

It will thus be appreciated that, by pulling down manually on the ball 312, the member 290 can be made to slide downwardly along the bore 284. During this descent, the ball 294 will remain in place closing its passageway, but the ball 302 will move downwardly in the event that the pressure above the piston 226 exceeds the combination of the pressure below the ball and the force exerted by the spring 304. When the ball 312 is released, the ball 300 will return to a closure position, and some of the atmosphere in the region between the two balls will pass downwardly below the ball 294. The process can then be repeated, to progressively pump out any atmosphere which may have leaked past the diaphragm 230, or in some other way has invaded the space above the piston 226.

The pump just described is a manual one, but it will be evident that it could be replaced by a battery-powered pump having a pressure-sensitive switch which starts the pump upon detection of a threshold pressure in the vacuum chamber.

It will now be appreciated that the arm 270 can rotate fully through 360°, carrying an object at its further end while doing so, and the compensating force applied by the piston 226 will remain the same. The equivalence of the moments exerted by the weight and exerted on the crank arm 256 will continue to be in accordance with the vector diagrams of FIGS. 9 and 10.

Moreover, the entire housing 212 can be pivoted about its centre axis 311, so that the arm 270 can be placed in any of a large number of positions, still fully counterbalancing the weight of an object which it carries.

While several embodiments of this invention have been illustrated in the accompany drawings, and described in the above disclosure, it will be evident to those skilled in the art that changes and modifications may be made therein, without departing from the essence of this invention as set forth in the appended claims.

What I claim is:

1. Apparatus for counterbalancing the weight of an object in a gravitational field comprising:
   a cylinder having first and second opposed ends,
   a piston slidably mounted within said cylinder, the piston defining with the first end a first chanber exposed to atmospheric pressure, the piston defining with the second end a second chamber in which the pressure is below atmospheric, the pressure difference across the piston from said first to said second chamber being substantially unchanged as the piston moves between two spaced-apart positions within the cylinder, whereby the piston is subjected to a substantially unchanging force due to said substantially unchanging pressure differential,
   a swingable member mounted such that it pivots about a substantially horizontal axis, the member being adapted to support the object at a location spaced from said axis, whereby the torque exerted by the object about said axis is the product of the weight of the object and the horizontal distance between said axis and a vertical line through the object,
   and cam and follower means which applied the said substantially unchanging force against the swingable member in a counterbalancing sense through a moment arm of which the length varies in proportion to the horizontal distance between said horizontal axis and a vertical line through the object.

2. The apparatus claimed in claim 1, in which the pressure in the second chamber is substantially a complete vacuum.

3. The apparatus claimed in claim 1, including a fixed frame portion, and in which the cylinder is fixed with respect to the swingable member, said frame portion defining the horizontal axis and defining a fixed projection extending upwardly from the horizontal axis to support a bearing, the piston having means for pressing against the bearing in the direction of said second chamber.

4. The apparatus claimed in claim 3, in which the pressure in the second chamber is substantially a complete vacuum.

5. The apparatus claimed in claim 1, including a fixed frame portion, the cylinder being fixed with respect to the frame portion, the swingable member having a bracket moving therewith, the bracket supporting remote from the horizontal axis a bearing positioned such that a line joining the bearing to the axis is substantially perpendicular to a line joining the axis to the place on the member where the object is suspended, the piston having means for pressing against the bearing in the direction of the second chamber.

6. The apparatus claimed in claim 5, in whcih the pressure in the second chamber is substantially a complete vacuum.

7. The apparatus claimed in claim 1, in which said means includes a cam plate fixed with respect to the piston, and a bearing which bears against said cam plate, and which moves with respect to the cam plate as the swingable member pivots about the said horizontal axis, the cam plate being angulated with respect to the cylinder axis, whereby to minimizes piston movement with respect to the cylinder as the swingable member pivots about the said horizontal axis.

8. The apparatus claimed in claim 1, in which the piston has an evacuating pump within it. 0, in which the 9. The apparatus claimed in claim 1, which further includes an adjustably variable friction means which controls the pivoting of the swingable member about said horizontal axis.

10. Apparatus for counterbalancing the weight of an object in a gravitational field comprising:
   suspension means for suspending the object to be counterbalanced and for following the object as it is moved in the gravitational field;
   said suspension means including a piston-cyclinder counterbalancing assembly having a piston and a cylinder reciprocable with respect to each other; a first element with a horizontal axis and a swingable arm swingable about the horizontal axis of said first element; said piston being connected to one of said first element and swingable arm and said cylinder being connected to the other thereof whereby to reciprocate the pistn and cylinder relatively to each other in response to swinging movement of the swingable arm about the horizontal axis of the first element;
   said cylinder having a first chamler at one end of said piston, said first chamber being at atmospheric pressure, and said cylinder having a second chamber at the other end of the said piston, said second chamber being without connection to any motorized source of constant fluid pressure, and having a substantially complete vacuum therein, whereby the net pressure on the piston as the piston and cylinder reciprocate with respect to each other is substantially atmospheric pressure for all positions of the piston with respect to the cylinder, thereby resulting in an substantially unchanging force on the piston for all positions thereof;
   said suspension means further including cam and follower means and being arranged so that the said force on the piston is applied as a torque against the swingable arm, such that the torque varies in proportion to the torque represented by the product of the weight of the object and the horizontal distance between the said horizontal axis and a vertical line through the object thus counterbalancing the object as the piston and cylinder reciprocate with respect to each other.

11. Apparatus for counterbalancing the weight of said object in the gravitational field as claimed in claim 10, wherein said piston is reciprocable in said cylinder to cause said other end thereof to abut an end wall of said cylinder for one position of said swingable arm;
   a passage from said lattern mentioned end wall of said cylinder to atmosphere;
   a check valve in said passage biased to permit escape of air from said cylinder whereby all air can be expelled from between said cylinder and said end wall as said other end of said piston abuts said end wall of said cylinder.

12. The apparatus claimed in claim 10, in which the suspension means includes a cam plate fixed with respect to the piston, and a bearing which bears against the cam plate and moves along the cam plate as the piston reciprocates with respect to the cylinder, the cam plate being angulated with respect to the piston axis whereby to minimize piston movement with respect to the cylinder as the swingable arm swings about the said horizontal axis.

13. The apparatus claimed in claim 1 piston has an evacuating pump within it. The apparatus claimed in claim 10, further including an adjustably variable friction means controlling the movement of the swingable arm about the said horizontal axis.

14. The apparatus claimed in claim 10, further including an adjustably variable friction means controlling the movement of the swingable arm about the said horizontal axis.

15. A piston cylinder assembly for use as a counterbalance for an object suspended in a gravitational field comprising:
   a cylinder;
   a piston reciprocable in said cylinder;
   said cylinder being open to atmosphere at one end of said piston;
   said cylinder being substantially completely evacuated at the other end of said piston, and without connection to any motorized source of constant fluid pressure, whereby the net pressure acting on said piston for all positions of said piston in said cylinder is substantially equal to atmospheric pressure.

* * * * *